(12) United States Patent
Liebich (10) Patent No.: US 9,376,212 B2
(45) Date of Patent: Jun. 28, 2016

(54) AIRCRAFT WITH AT LEAST ONE PRESSURIZED FUSELAGE AREA AND AT LEAST ONE UNPRESSURIZED AREA AND METHOD FOR VENTILATING OF AN UNPRESSURIZED AREA OF AN AIRCRAFT

(75) Inventor: Martin Liebich, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1404 days.

(21) Appl. No.: 13/015,255

(22) Filed: Jan. 27, 2011

(65) Prior Publication Data
US 2011/0183595 A1 Jul. 28, 2011

Related U.S. Application Data

(60) Provisional application No. 61/298,739, filed on Jan. 27, 2010.

(30) Foreign Application Priority Data

Jan. 27, 2010 (DE) .......................... 10 2010 005 902

(51) Int. Cl.
| B24D 13/00 | (2006.01) |
|---|---|
| B60H 1/00 | (2006.01) |
| B61D 27/00 | (2006.01) |
| B63J 2/00 | (2006.01) |
| B64D 13/02 | (2006.01) |

(Continued)

(52) U.S. Cl.
CPC ......... *B64D 13/02* (2013.01); *B64C 2001/0027* (2013.01); *B64D 2013/0614* (2013.01); *B64D 2013/0655* (2013.01); *Y02T 50/44* (2013.01); *Y02T 50/56* (2013.01)

(58) Field of Classification Search
CPC ...................................................... B64D 13/02
USPC ...................................................... 454/70, 76
See application file for complete search history.

(56) References Cited

U.S. PATENT DOCUMENTS

| 6,401,473 B1 * | 6/2002 | Ng et al. .......................... 62/239 |
| 6,415,621 B2 * | 7/2002 | Buchholz et al. ............... 62/402 |

(Continued)

FOREIGN PATENT DOCUMENTS

| DE | 944 698 B | 6/1956 |
| DE | 10 009 373 C2 | 3/2002 |

(Continued)

OTHER PUBLICATIONS

German Office Action for German Application No. 10 2010 005 902.1-22 mailed Dec. 9, 2010.

(Continued)

*Primary Examiner* — Steven B McAllister
*Assistant Examiner* — Jonathan Cotov
(74) *Attorney, Agent, or Firm* — Ingrassia Fisher & Lorenz, P.C.

(57) ABSTRACT

An aircraft includes, but is not limited to at least one fuselage with at least one pressurized fuselage region and at least one non-pressurized region and at least one air conditioning system for air conditioning the at least one pressurized fuselage region. The non-pressurized region includes, but is not limited to an air inlet and an air outlet connected to an air source from the pressurized fuselage region. Consequently it is possible to avoid the use of blowers, outlet valves and ram air flaps for ventilating non-pressurized regions of an aircraft.

22 Claims, 8 Drawing Sheets

(51) Int. Cl.
*B64C 1/00* (2006.01)
*B64D 13/06* (2006.01)

(56) References Cited

U.S. PATENT DOCUMENTS

| | | | |
|---|---|---|---|
| 6,634,597 B2 * | 10/2003 | Johnson et al. | 244/118.5 |
| 6,658,881 B1 | 12/2003 | Plattner | |
| 7,766,276 B2 * | 8/2010 | Buchholz et al. | 244/119 |
| 8,336,821 B2 * | 12/2012 | Shell et al. | 244/118.5 |
| 2004/0010843 A1 * | 1/2004 | Erdmann et al. | 4/321 |
| 2004/0172963 A1 * | 9/2004 | Axe et al. | 62/401 |
| 2005/0051668 A1 * | 3/2005 | Atkey et al. | 244/118.5 |
| 2006/0138280 A1 * | 6/2006 | Markwart et al. | 244/129.1 |
| 2007/0062371 A1 * | 3/2007 | Eilers | 95/138 |
| 2007/0117501 A1 * | 5/2007 | Solntsev et al. | 454/76 |
| 2008/0237397 A1 * | 10/2008 | Seibt | 244/118.5 |
| 2009/0084896 A1 * | 4/2009 | Boucher | B64D 13/08 244/118.5 |
| 2009/0134276 A1 * | 5/2009 | Chaniot | 244/129.2 |
| 2009/0205804 A1 * | 8/2009 | Di Battista et al. | 165/61 |
| 2011/0046822 A1 * | 2/2011 | Gray et al. | 701/3 |
| 2012/0199315 A1 * | 8/2012 | Barreau et al. | 165/42 |

FOREIGN PATENT DOCUMENTS

| | | |
|---|---|---|
| DE | 10 2004 061 372 A1 | 7/2006 |
| EP | 0382604 A1 | 8/1990 |
| EP | 1 188 666 A1 | 3/2002 |

OTHER PUBLICATIONS

German Office Action for German Application No. 10 2010 005 902.1-22 mailed Dec. 15, 2014.

* cited by examiner

AIRCRAFT WITH AT LEAST ONE PRESSURIZED FUSELAGE AREA AND AT LEAST ONE UNPRESSURIZED AREA AND METHOD FOR VENTILATING OF AN UNPRESSURIZED AREA OF AN AIRCRAFT

REFERENCE TO RELATED APPLICATIONS

This application claims the benefit of the filing date of German Patent Application No. 10 2010 005 902.1 filed Jan. 27, 2010 and of U.S. Provisional Patent Application No. 61/298,739 filed Jan. 27, 2010, the which are incorporated herein by reference in their entirety.

TECHNICAL FIELD

The technical field relates to an aircraft with a fuselage that comprises at least one pressurised fuselage region and at least one non-pressurised region. The technical field further relates to a method for ventilating a non-pressurised region of an aircraft.

BACKGROUND

Larger commercial aircraft that fly at high altitudes and for this purpose comprise a pressurised fuselage there are frequently also regions where it is not necessary to carry out pressurisation. Nevertheless, such non-pressurised regions frequently comprise ventilation systems that provide ventilation by means of blowers operated electrically or by way of hot air, which serves for cooling and for avoiding potentially explosive air/fuel mixtures or air/oil mixtures. In the non-pressurised region there could be systems that could cause ignition of a potentially explosive air/fuel mixture. Accordingly, it should be ensured that already prior to operating these systems, which are, for example, implemented as air conditioning system components (e.g. in aircraft of the type A380 by AIRBUS referred to as an air generation unit, AGU) or as a trimmable horizontal stabiliser actuator, THSA, as a result of ventilating their installation space no such situations may be created. Such ventilation systems must be certifiable based on regulation SFAR 88.

The air for separate ventilation of non-pressurised regions of the aircraft fuselage is sucked from the outside from the surroundings of the aircraft and is later discharged back to the outside. This could be implemented in flight by taking up ram air, and on the ground by means of one or several blowers. To this effect these non-pressurised regions comprise at least two flaps/openings in the outer skin for taking up incoming air and for discharging exhaust air, and optionally comprise at least one blower.

DE 10 009 373 C2 and U.S. Pat. No. 6,415,621 B2 disclose an air conditioning system for a commercial aircraft with an auxiliary compressor that aspirates air from the environment and provides redundant auxiliary ventilation in the installation space of the aircraft air conditioning system.

In the development of aircraft it is an important endeavour to reduce the take-off weight so as to save fuel and consequently reduce operating costs. Carrying along ventilation blowers for non-pressurised regions of an aircraft may not be considered to be an optimum solution from the point of view of weight. Providing flaps and/or openings in the outer skin of an aircraft impairs the aerodynamic quality of the aircraft and may thus not be considered to be particularly advantageous.

It may thus be at least one object to propose an aircraft comprising an aircraft fuselage that comprises at least one pressurised region and at least one non-pressurised region, in which aircraft it is not necessary to carry along separate blowers for ventilating non-pressurised regions of the aircraft, and in which aircraft it is possible to make do to the greatest extent possible without additional flaps or openings in the outer skin of the aircraft. This could result in the potential of significant savings in weight, which could have a favourable effect on the operating costs of the aircraft. In addition, other objects, desirable features and characteristics will become apparent from the subsequent summary and detailed description, and the appended claims, taken in conjunction with the accompanying drawings and this background.

SUMMARY

According to a first embodiment, the aircraft comprises at least one fuselage with at least one pressurised fuselage region and at least one non-pressurised region, at least one system that needs to be ventilated in flight, wherein the non-pressurised fuselage region comprises an air inlet and an air outlet. A particularly characteristic feature of the aircraft according to the invention consists of the air inlet of the non-pressurised region being connected to an air source from the pressurised fuselage region.

Usually, excess air, which is fed into the pressurised fuselage region through an air conditioning system, is conveyed through outlet valves back to the surroundings of the aircraft, wherein by controlling the opening cross section of the outlet valves, which usually are located on the underside of the aircraft fuselage, the pressure in the interior of the aircraft fuselage is controlled. While the discharged air is frequently used for providing additional thrust to the aircraft, according to the invention this air flowing from the pressurised fuselage region may flow into the non-pressurised region where it may provide a ventilation function in order to be conveyed from there to the surroundings of the aircraft.

As a result of the above, some ventilation blowers, outlet valves and ram air flaps may be done without, which are equipped to remove air from the surroundings of the aircraft, feed the air to the non-pressurised region, which air, after completion of the ventilation function, is fed back to the aircraft surroundings.

In this arrangement the air source may be of any type. Advantageous types of air sources, which are particularly suited to complying with presently valid certification rules for an aircraft according to the invention, are described further below.

According to another embodiment, the air source is an air outlet valve, arranged at a boundary surface between the pressurised region and the non-pressurised region, for controlling the air pressure of the pressurised fuselage region. In the context of a non-pressurised region of the aircraft fuselage, which non-pressurised region does not accommodate a component of the aircraft's air conditioning system, an air source in the form of the outlet designed as an air outlet valve could be sensible in the pressurised fuselage region. This must be limited because ventilation of the non-pressurised region needs to have taken place already when an air conditioning system or a component of such an air conditioning system is operated in this region. However, since the air flowing from the outlet valve is provided by the air conditioning system itself, this air source may not be sensible, from a technical point of view, for the above-mentioned purpose. Furthermore, this air source is available only if the aircraft cabin is pressurised, i.e., when the doors are closed. However, other non-pressurised fuselage regions may be ventilated by such an arrangement if in that region only actuators, various items of equipment or apparatus are accommodated that need to be operated only after the air conditioning system has been started up. This may include, for example, the trim actuator of a horizontal stabiliser (THSA) or an undercarriage. Such an actuator will be operable without any difficulties even only after start-up of the air conditioning system and after all the doors have been closed.

According to a further embodiment, the air source is at least one air suction-removal nozzle which is connected to the air inlet of the non-pressurised region by way of a suction removal pipe. In some exposed regions of a pressurised fuselage region of an aircraft, air is removed by suction in a targeted manner (this process is known as cabin air extraction) so that, for example, no unpleasant odours may spread to adjacent fuselage regions, for example in a passenger cabin of the aircraft. By way of a suction removal pipe, the air that has been removed by suction could be re-used, which air would otherwise just be conveyed to the surroundings of the aircraft.

The air suction-removal nozzle could be arranged in an aircraft galley (also known as "galley") in a passenger cabin. In particular in galleys, frequently air is removed by suction to prevent galley odours from being conveyed, by way of conventional air outlets in an aircraft cabin, by way of a recirculation unit to an air mixer, but instead to convey said air directly to the surroundings of the aircraft. This air, which has been removed by suction, would be well suited to ventilation of non-pressurised regions.

According to another embodiment, the air suction-removal nozzle is arranged in an aircraft toilet, a lavatory or a shower in a passenger cabin. The same advantages as mentioned in the context of the galley also apply to the aircraft toilet, crew rest compartments, fitness studios and parts of the cargo hold that are, for example, used for transporting animals.

According to another embodiment, the air source is implemented by at least one exhaust valve of at least one equipment compartment, which exhaust valve is connected by way of an air pipe to the air inlet of the non-pressurised region. This is of particular advantage because equipment compartments in the interior of a pressurised fuselage region are often ventilated while the air conditioning system is not yet in operation in order to cool equipment situated therein, which equipment emits heat. Accordingly, in this arrangement an air source is already available before the air conditioning system has been started up, which air source may be used for ventilation of the non-pressurised regions.

Further, the equipment compartment is an avionics compartment or avionics rack, which, for example, provides equipment for an in-flight entertainment (IFE) system that comprises various processing units that are necessary for regular operation of the aircraft. If equipment in the avionics compartment is started up, usually some cooling or a blower is active so that an air source is available already prior to start-up of the air conditioning system.

According to a further embodiment, the non-pressurised region is arranged between the aircraft fuselage and a belly fairing. In larger modern commercial aircraft, for example the Airbus A380, in this region some of the components of the air conditioning system are arranged so that especially in that region ventilation is sensible without being dependent on additional blowers or ram air inlets.

According to a likewise embodiment, the non-pressurised fuselage region is arranged between a pressure dome and a tail cone of the aircraft fuselage. In this region the trim actuator for the elevator of the aircraft is frequently used, wherein operation of such a trim actuator would also be possible after start-up of an air conditioning system of the aircraft. Accordingly, with corresponding use all the available air sources would be open to this fuselage region.

According to another embodiment, the non-pressurised fuselage region is designed as a wheel well of the aircraft. Depending on the installation space provided in the wheel well, here again all the available air sources could be used. This applies analogously to the regions of tail units and the wing, which regions are not used as tanks.

According to a further embodiment, a heat exchanger is arranged upstream of the exhaust air outlet and is designed to be applied with air flowing into the air inlet in order to cool or heat a fluid (liquid or gaseous) that flows through the heat exchanger. Since the air from the various air sources is frequently conditioned at considerable expenditure, it is in the interest of the concept of a particularly energy-saving aircraft for this cooling/heating performance if at all possible benefiting more than one consumer. In this context it is particularly advantageous if the air flowing into the air inlet of the non-pressurised region is at first used for cooling/heating a fluid or medium that flows through a heat exchanger. Since it is not expected that the through-flowing air is heated to such an extent that a fuel/air mixture could be ignited, this does not represent any difficulty in relation to the ventilation of a non-pressurised region. One possible field of application might relate to a central galley cooling system, which is, for example, known from the series of AIRBUS A380 aircraft, which system is also referred to as "supplemental cooling" (ATA21-59).

As an alternative or in addition to the above, the air flowing out by way of the air outlet from the non-pressurised region could flow through the heat exchanger, or through a further heat exchanger, in order to bring about cooling. However, in this context it should be mentioned that in the most unfavourable case this air might contain a small fraction of fuel.

According to another embodiment, the heat exchanger comprises an air outlet from which the air flows into the surroundings of the aircraft. After ventilation or air conditioning of a pressurised region, the air flowing through the heat exchanger has also caused an additional cooling effect on a fluid, has at the same time ventilated a non-pressurised region, and could subsequently be led out to the surroundings in such a manner that additional thrust for the aircraft is generated.

According to a further embodiment, the aircraft comprises a pipe system that is designed to connect the air inlet of the non-pressurised region to two or more air sources from the pressurised fuselage region. This is advantageous because in this manner several air sources together could form a shared air source with a shared air pipe that could be used for all non-pressurised regions. By integrating unidirectional valves and other pipe engineering means, in this manner the available air could be conditioned to predetermined parameters.

In this context it would also be particularly sensible to integrate closable valves in the pipe system so that when the aircraft is started, prior to start-up of the air conditioning system, any backflow from other air sources into the cabin may be prevented.

If the aircraft, furthermore, comprises systems, for example the AGU, which comprise an internal ventilation system, direct feed-in of air from the air source from the pressurised fuselage region could be particularly sensible.

An additional or alternative air source could be provided by exhaust air of a fuel cell system. In addition, ventilation, using the characteristics of the invention, of a region comprising a fuel cell system would also be advantageous.

A method is also provided for ventilating a non-pressurised region of an aircraft, wherein the significant steps of this method according to an embodiment have stale air being removed from a pressurised fuselage region, this stale air being fed into the non-pressurised region, and then being discharged from the non-pressurised region.

As already explained above, leading the air that flows into the non-pressurised region through a heat exchanger that is designed to cool a fluid flowing through the heat exchanger could be particularly advantageous. The air once cooled, compressed and conditioned at relatively great expenditure may correspondingly be used for application purposes other than simple ventilating. Compressing the air requires energy, which by means of the characteristics significant in the context of the invention of the aircraft according to the invention is available for further use. However, as a result of this, the additional thrust resulting from the air flowing out into the surroundings of the aircraft is somewhat reduced.

BRIEF DESCRIPTION OF THE FIGURES

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
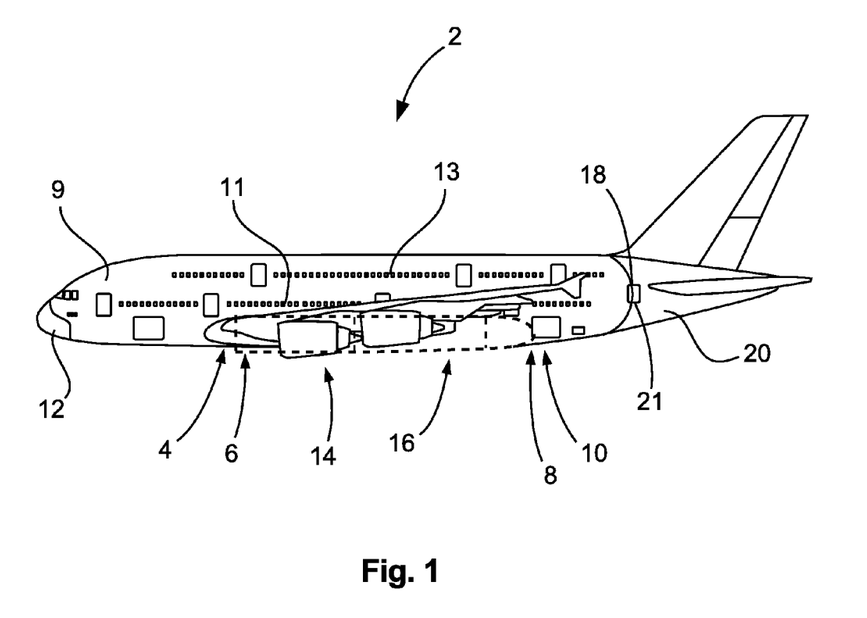
FIG. 1 shows a lateral view of an aircraft according to an embodiment.

FIG. 1 shows an aircraft 2 according to an embodiment which at positions that have been selected as an example and are not binding comprises a randomly selected number of outlet valves 4, 6, 8 and 10. Apart from principally pressurised fuselage regions, for example 9, 11 and 13 in the form of a cockpit and two aircraft cabins, as an example a non-pressurised region 12 at a radome, two non-pressurised regions 14 and 16 at a wing/fuselage transition, and in the region of a pressure dome 18 a further non-pressurised region 20 in the region of the tail units are arranged.

In order to avoid potentially explosive fuel/air mixtures in these regions, and in order to prevent excessive heat input, at least the non-pressurised regions 14, 16 and 20 are to be ventilated. Normally in the state of the art a combination of ram air inlets and blowers is used so that during flight as a result of inflowing ram air, and when situated on the ground as a result of operation of the blowers, adequate flushing of these non-pressurised regions 12, 14, 16 and 20 is made possible.

However, since at least from the outlet valves 4, 6, 8 and 10 considerable quantities of air are conveyed from the interior of the aircraft 2 to the surroundings of the aircraft 2, according to the present invention it may be sensible to use the air to be conveyed to the surroundings first for ventilation of the non-pressurised regions 12, 14, 16 and 20.

Various measures suggest themselves for this, which measures, for the sake of simplicity, are shown below with reference to block diagrams.

Figure 2A:
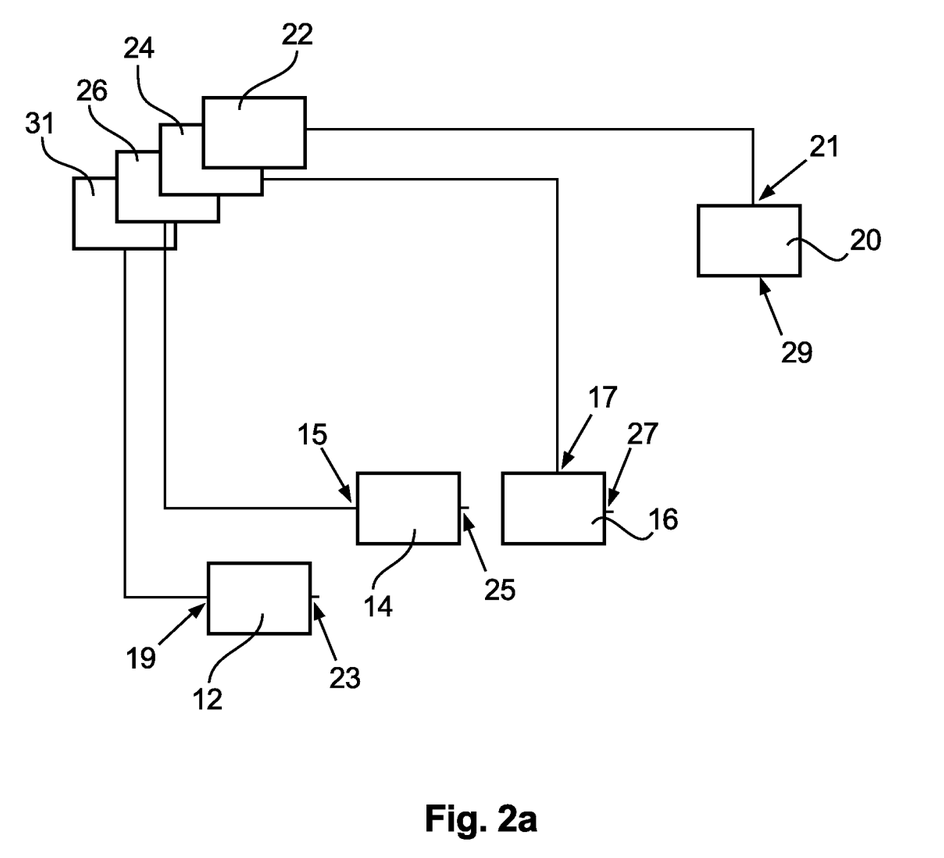
FIG. 2a and FIG. 2b show exemplary embodiments of the aircraft in a block diagram with non-pressurised regions and air sources, as well as in a diagrammatic section.

In FIG. 2a air sources 22, 24 and 26 are shown that merely as an example may be designed in the form of outlet valves 4, 6, 8 and 10 or suction removal connections or air outlets from equipment compartments.

Below, it is assumed that the air source 26 is an air outlet from an equipment compartment which during start-up of the equipment compartment or of the equipment contained therein and of the ventilation system connected to them provides air by way of a corresponding air inlet 15 in a non-pressurised region 14 that, for example, is located between a faring of the wing-fuselage transition ("belly fairing") and the aircraft fuselage. Likewise, suction removal openings 24 and 31 as air sources, for example of an aircraft galley and an aircraft toilet, could be used to convey air by way of a respective air inlet 17 and 19 to a further non-pressurised region 12 and 16.

Figure 2B:
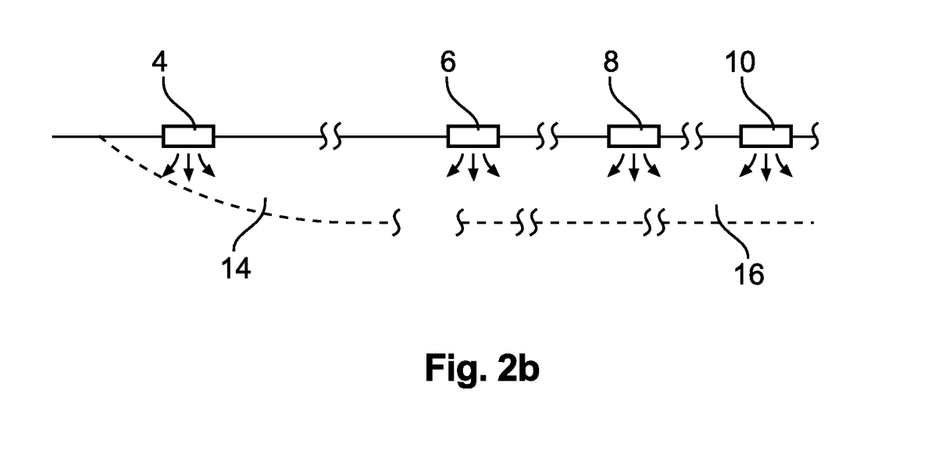

According to FIG. 2b as an example, as an alternative or in addition, one or several of the outlet valves 4, 6, 8 and 10 of the aircraft fuselage, instead of conveying air directly to the surroundings, could convey air into the non-pressurised regions 14 and 16 underneath the aircraft fuselage in the region of the wing/fuselage transition, which regions are enclosed by the belly fairing. In this case in particular the pressurised fuselage regions 11 and 13 serve as air sources.

Furthermore, by way of an air inlet 21, air could be conveyed to the non-pressurised region 20 in the aft section of the aircraft 2, wherein the air inlet could be situated either in a pressure dome 18 or could be implemented as an air pipe that is connected to the air outlet valve 8 or 10. The air inlet 21 itself could also be designed as an air outlet valve that may be used to regulate the cabin pressure.

Figure 3:
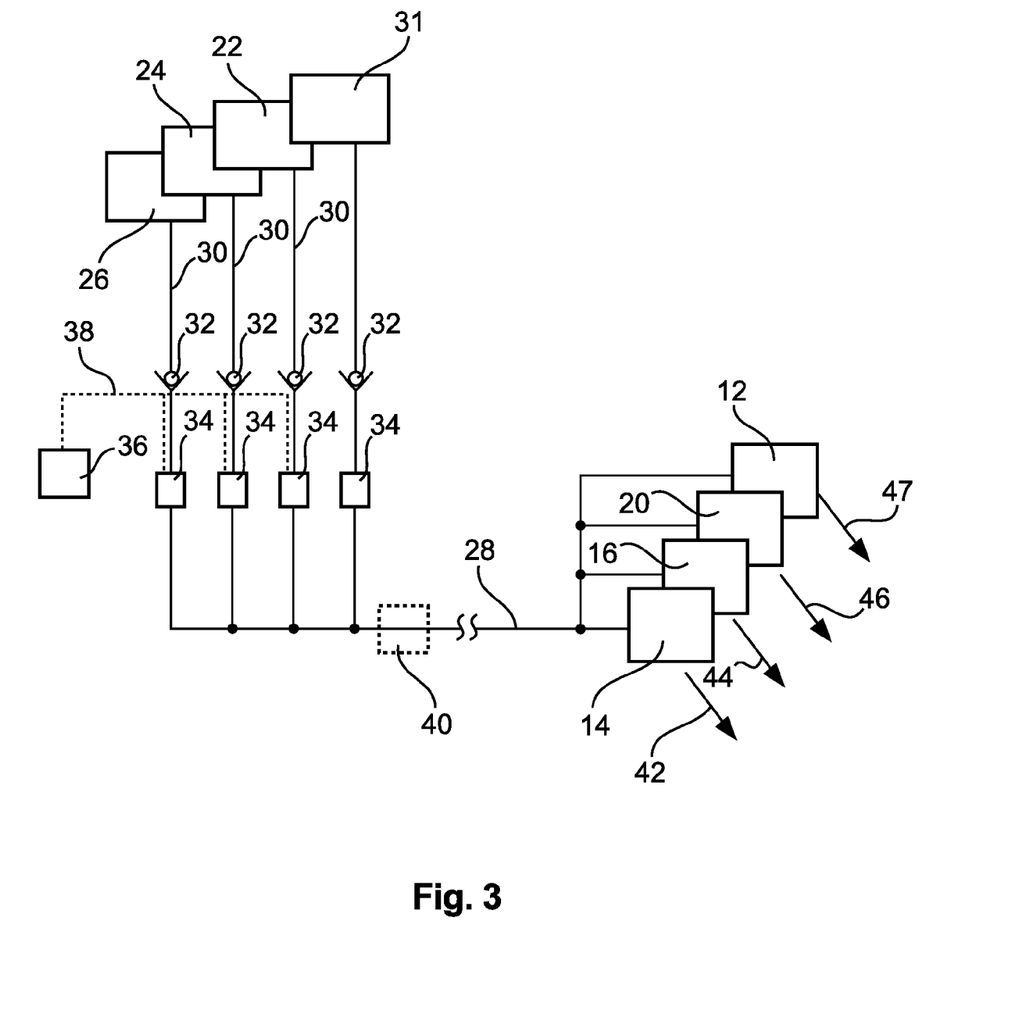
FIG. 3 shows a further exemplary embodiment of the aircraft in a modified block diagram.

According to FIG. 3 another exemplary embodiment is also imaginable in which in an exemplary manner air sources 22, 24, 26 and 31, which of course do not represent a complete listing of all imaginable air sources of an aircraft 2 according to the invention, are connected to a shared air pipe 28, which conveys air into the non-pressurised regions 12, 14, 16 and 20. To this effect each air source 22, 24, 26 and 31 comprises a feed line 3 on which a unidirectional valve 32 is arranged. Downstream of this in each case a controlled switching valve 34 is arranged, after the air pipe 28 connects, from which air pipe 28 all the non-pressurised regions 12, 14, 16 and 20 may obtain their air. The controlled switching valves 34 may be controlled by a control unit 36 which for this purpose is connected to the switching valves 34 by means of a data connection 38.

The control unit 36 could, for example, be connected to an on-board system, for example the flight management system (FMS) or to other systems that may provide operating data relating to the aircraft, so that the then current operating state of the aircraft 2 may be determined, or so that it may be determined whether ventilation of the non-pressurised regions 14, 16 and 20 is desired, and which of the air sources 22, 24 and 26 may or must not be used. To this effect information, for example relating to the operating state of the air conditioning system, could be called up, as could, by way of an aircraft configuration system, parameters relating to corresponding air sources and non-pressurised regions and the like.

The exemplary embodiment of FIG. 3 could correspondingly represent a particular simplification in that, in a bundled manner or distributed at several locations, air is made available centrally for use in ventilation.

In order to achieve still considerably improved utilisation of the air provided for cooling the air from the various air sources 22, 24 and 26, a heat exchanger 40 could be arranged in the air pipe 28 or at a position through which air from the air pipe 28 flows, in order to, for example, lead away heat of a fluid. If the air supply is adequate, it is not to be expected that the air prior to reaching the non-pressurised regions 14, 16 and 20 has heated to such an extent that there is a danger of explosion or the like. As an alternative to this, the heat exchanger 40 could also be arranged in the region of exhaust air outlets 42, 44, 46 and 47 of the non-pressurised regions 14, 16 and 20 where air flows through it.

Figure 4:
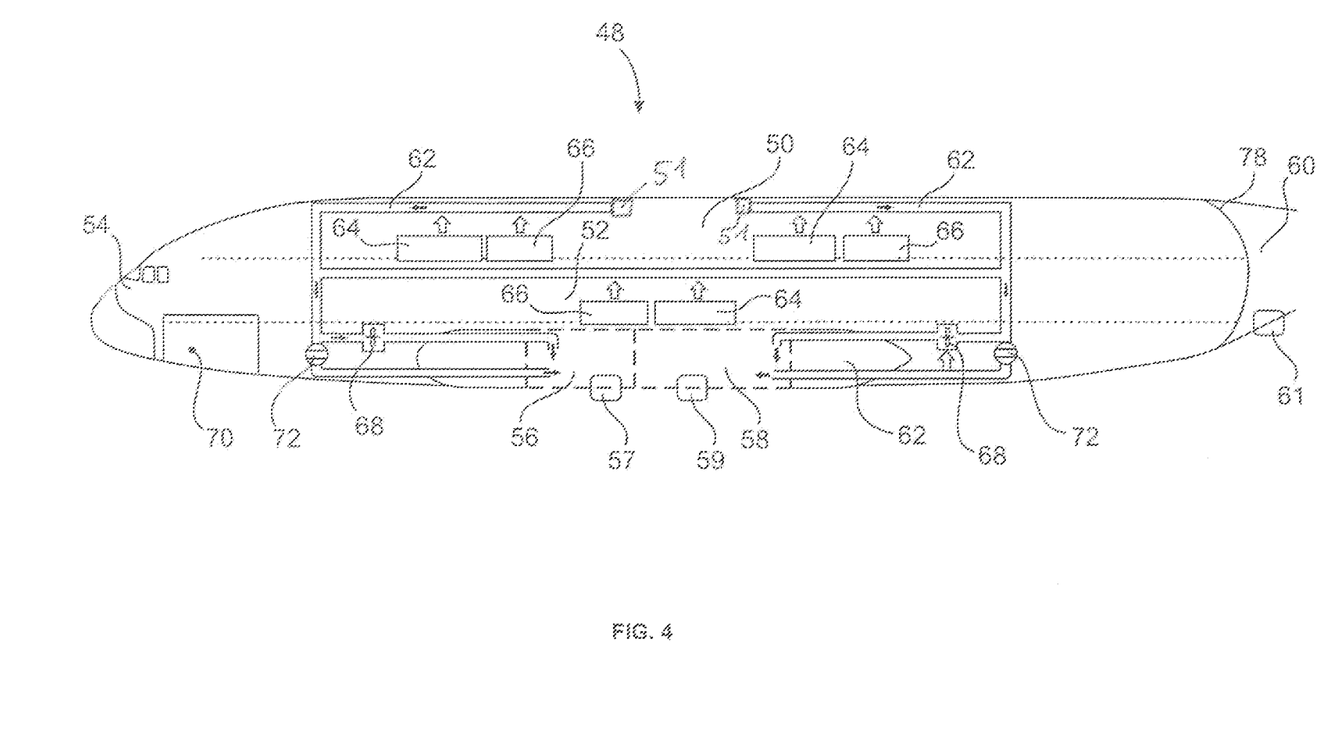
FIG. 4 shows a lateral section of a further exemplary embodiment of the aircraft according to an embodiment.

FIG. 4 shows a lateral section of an aircraft 48 that in an exemplary manner comprises pressurised fuselage regions 50, 52 and 54 as well as, in an exemplary manner, non-pressurised regions 56, 58 and 60. It should be noted that these pressurised or non-pressurised regions are shown purely in an exemplary manner and are not suitable to limit the subject of the invention.

FIG. 4 further shows exhaust air pipes 62 by means of which air pipes 62 exhaust air, for example from suction nozzles 64 of toilets or suction nozzles 66 of galleys, is led away, wherein in the present embodiment blowers 68 are used in order to convey air through the exhaust air pipes 62 to the non-pressurised regions 56 and 58. At least one exhaust valve 51 is connected by way of the exhaust air pipe 62 to the air inlet of the non-pressurized region 56, 58. At the same time air may also be removed from an avionics compartment 70 and may be conveyed to the non-pressurised regions 56 and 58.

The exhaust air that usually flows through the exhaust valves may correspondingly be further used, wherein the air is then conveyed from the non-pressurised regions 56 and 58 to the surroundings of the aircraft.

Any cabin extraction valves 72 may be opened from a defined overpressure onwards in the pressurised regions 50, 52 and 54, and consequently the blowers 68 are no longer required.

The air fed into the non-pressurised regions 56 and 58 may exit to the surroundings of the aircraft through air outlets 57 and 59.

Figure 5:
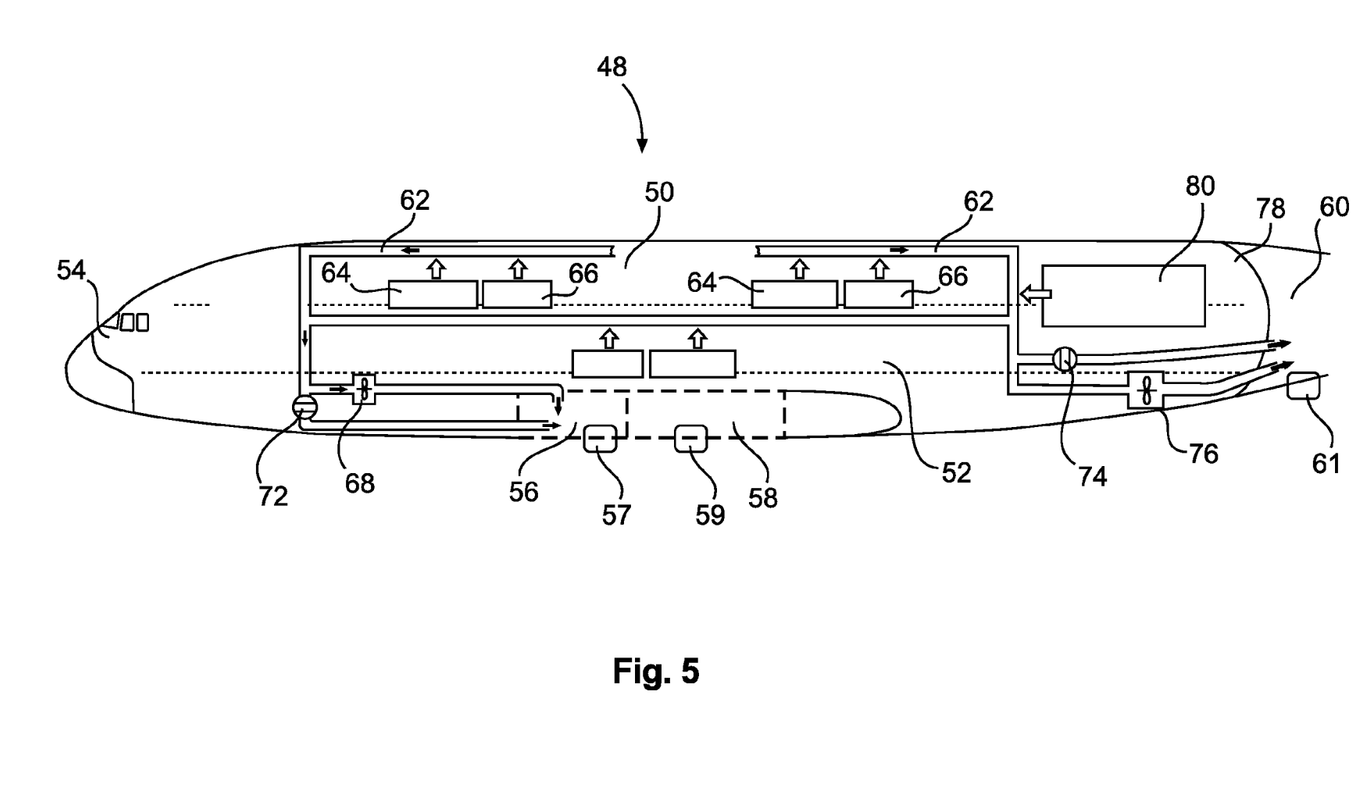
FIG. 5 shows a lateral section of a further exemplary embodiment of the aircraft according to an embodiment.

FIG. 5 shows a modification of an aircraft 48 in which the non-pressurised region 60 in the aft section is also ventilated. This could be implemented by an additional connection with the exhaust air pipe 62 by way of a cabin extraction valve 74 and by way of a further blower 76, which cabin extraction valve 74 and further blower 76 convey air through openings provided for this purpose in a pressure bulkhead 78. Through an air outlet 61 air may be conveyed from the non-pressurised region 60 to the surroundings of the aircraft.

In addition, in the fuselage there is a rest compartment 80 ("crew rest compartment") whose air is also removed by way of the exhaust air pipe 62.

Figure 6:
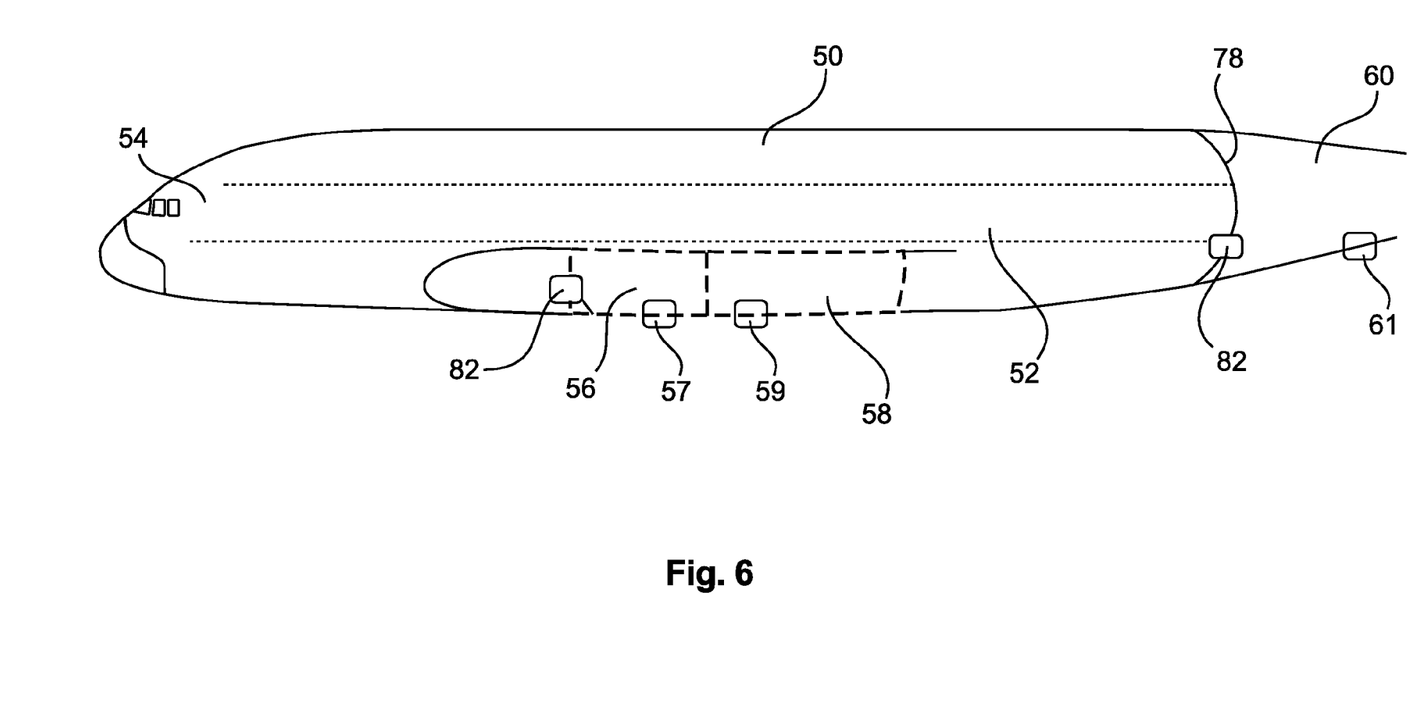
FIG. 6 shows a lateral section of a further exemplary embodiment of the aircraft.

FIG. 6 merely shows in a diagrammatic manner that an air supply to the non-pressurised regions 56, 58 and 60 may also be implemented by means of cabin air outlet valves 82 that are used to regulate the pressure in the pressurised regions 50, 52 and 54.

Figure 7:
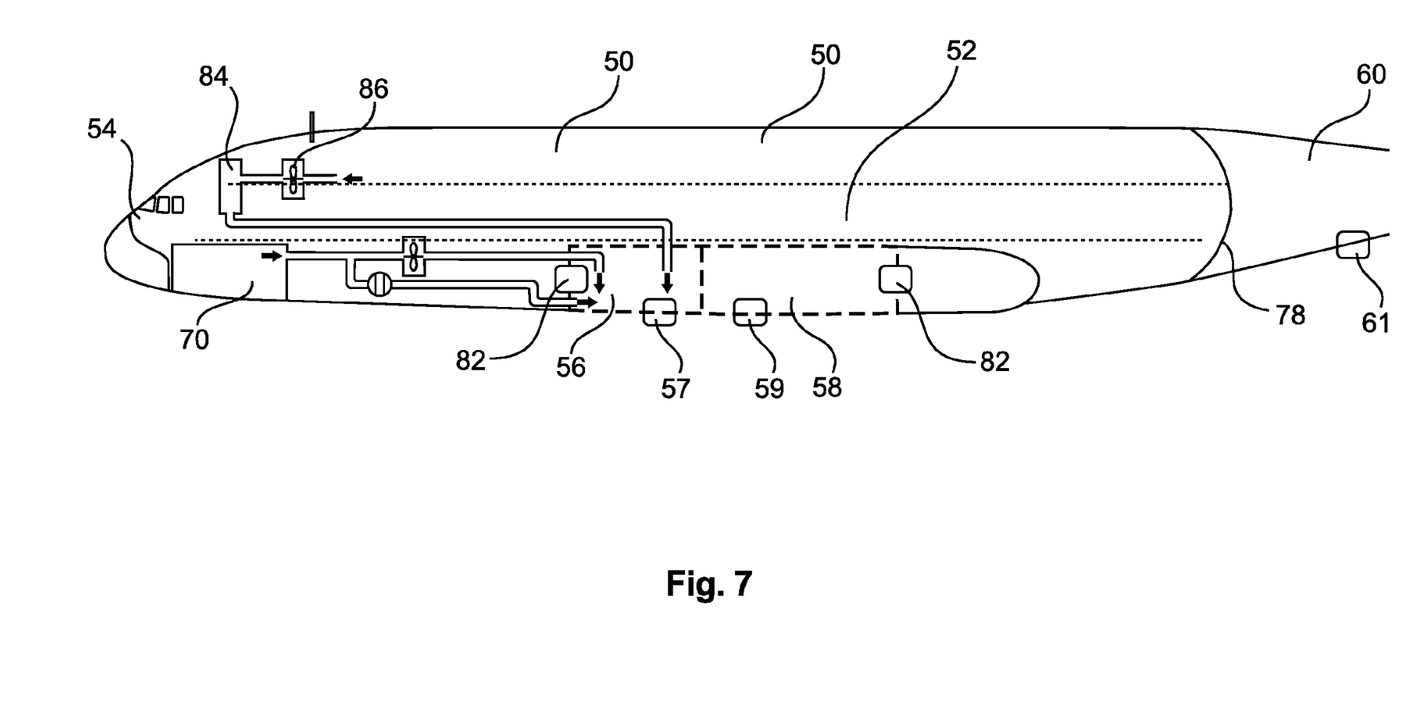
FIG. 7 shows a lateral section of a further exemplary embodiment of the aircraft.

FIG. 7 furthermore shows that apart from an avionics compartment 70 an avionics rack 84 may also be ventilated by means of a blower 86, and the exhaust air may be conveyed to the non-pressurised regions 56 and 58. In addition, cabin pressure control valves 82 are used that from the pressurised regions 50, 52 and 54 may convey air into non-pressurised regions 56 and 58, and in so doing may at the same time regulate the pressure.

Figure 8:
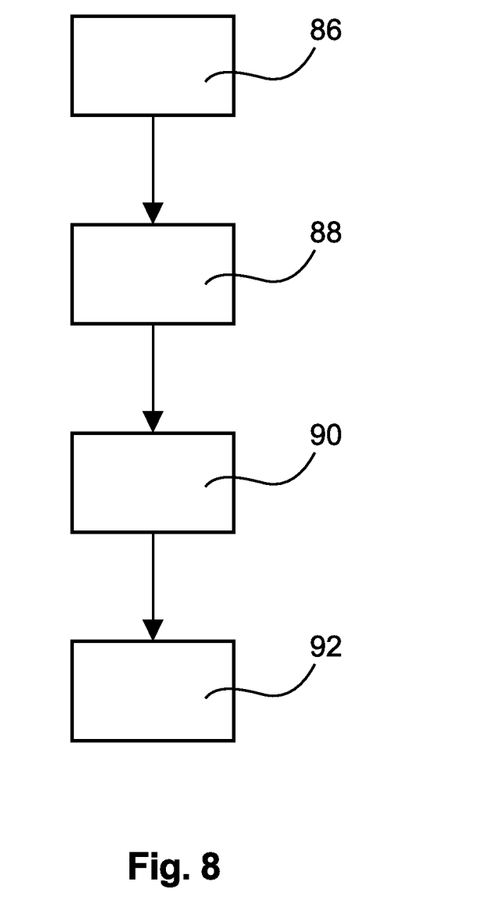
FIG. 8 shows a method according to an embodiment.

Finally, FIG. 8 shows an exemplary embodiment of a method according to the invention with the four essential steps of removing 86 stale air from a pressurised fuselage region; feeding 88 the stale air into the non-pressurised region; leading out 90 from the non-pressurised region; and optionally passing 92 the air flowing into the non-pressurised region through a heat exchanger that is designed to cool or heat a fluid flowing through the heat exchanger.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An aircraft, comprising:
   at least one fuselage with at least one pressurized fuselage region and at least one non-pressurized region comprising an air inlet and an air outlet for discharging air to the surrounding of the aircraft from the non-pressurized region; and
   at least one system for conditioning the at least one pressurized fuselage region; and an air source from the pressurized fuselage region connected directly to the air inlet of the non-pressurized region to convey air into the non-pressurized region to ventilate the non-pressurized region.

2. The aircraft according to claim 1, wherein the conditioning is air conditioning.

3. The aircraft according to claim 1, wherein the conditioning is ventilating.

4. The aircraft of claim 1, wherein the air source is an air outlet valve arranged at a boundary surface between the pressurized fuselage region and the non-pressurized region, for regulating an air pressure of the pressurized fuselage region.

5. The aircraft of claim 1, wherein the air source is at least one air suction-removal nozzle connected to the air inlet of the non-pressurized region by way of an exhaust air pipe.

6. The aircraft of claim 5, wherein the at least one air suction-removal nozzle is arranged in a galley in a passenger cabin.

7. The aircraft of claim 5, wherein the at least one air suction-removal nozzle is arranged in an aircraft toilet in a passenger cabin.

8. The aircraft of claim 5, wherein the at least one air suction-removal nozzle is arranged in a lavatory in a passenger cabin.

9. The aircraft of claim 5, wherein the at least one air suction-removal nozzle is arranged in shower in a passenger cabin.

10. The aircraft of claim 1, wherein the air source is at least one exhaust valve of at least one compartment, which the at least one exhaust valve is connected by way of an exhaust air pipe to the air inlet of the non-pressurized region.

11. The aircraft of claim 10, wherein the at least one compartment is an avionics compartment.

12. The aircraft of claim 1, wherein the air source is at least one exhaust valve of at least one fitness studio, which the at least one exhaust valve is connected by way of an exhaust air pipe to the air inlet of the non-pressurized region.

13. The aircraft of claim 1, wherein the non-pressurized region is arranged between the at least one fuselage and a belly fairing.

14. The aircraft of claim 1, wherein the non-pressurized region is arranged between a pressure bulkhead and a tail cone of the at least one fuselage.

15. The aircraft of claim 1, wherein the non-pressurized region is designed as a wheel well of the aircraft.

16. The aircraft of claim 1, wherein a heat exchanger is arranged upstream of the air outlet and is designed to be pressurised by air in order to cool a fluid that flows through the heat exchanger.

17. The aircraft of claim 16, wherein the heat exchanger comprises an air outlet from that air flows into surroundings of the aircraft.

18. The aircraft of claim 1, further comprising a pipe that is designed to connect the air inlet of the non-pressurized region to at least one air source from the pressurized fuselage region.

19. The aircraft of claim 1, wherein a heat exchanger is arranged such that air flowing out by way of the air outlet from the non-pressurized region flows through the heat exchanger.

20. A method for ventilating a non-pressurized region of an aircraft, comprising the steps of:
removing stale air from a pressurized fuselage region;
feeding the stale air into the non-pressurized region via an air inlet of the non-pressurized region, the air inlet of the non-pressurized region connected directly to the pressurized fuselage region to receive the stale air;
ventilating the non-pressurized region with the stale air; and discharging air to the surrounding of the aircraft from the non-pressurized region through an air outlet of the non-pressurized region.

21. The method of claim 20, further comprising the step of passing the air that flows into the non-pressurized region through a heat exchanger that is designed to cool a fluid flowing through the heat exchanger.

22. The method of claim 20, further comprising the step of passing the air that flows out from the non-pressurized region through a heat exchanger.

* * * * *